US005984246A

United States Patent [19]

Gardner

[11] Patent Number: 5,984,246

[45] Date of Patent: Nov. 16, 1999

[54] GLUE GUN STAND

[76] Inventor: Sharon L. Gardner, P.O. Box 284, Scotts Mills, Oreg. 97375

[21] Appl. No.: 09/039,741

[22] Filed: Mar. 16, 1998

Related U.S. Application Data

[63] Continuation of application No. 08/649,231, May 17, 1996, abandoned.

[51] Int. Cl.[6] .......... F16M 11/00

[52] U.S. Cl. .......... 248/176.1; 248/117.2

[58] Field of Search .......... 248/176.2, 117.1, 248/117.2, 174, 176.1, 177.1, 376.03, 117.5, 117.6, 117.7, 512, 539, 513; 211/70.6

[56] References Cited

U.S. PATENT DOCUMENTS

| | | | |
|---|---|---|---|
| D. 170,798 | 11/1953 | Dundon et al. | D58/13 |
| D. 208,979 | 10/1967 | Edgerton | D26/1 |
| D. 262,862 | 2/1982 | Lytle | D8/71 |
| D. 275,931 | 10/1984 | Kober | D8/71 |
| D. 307,105 | 4/1990 | Nusse et al. | D8/71 |
| D. 379,042 | 5/1997 | Meisner et al. | D6/407 |
| 2,576,560 | 11/1951 | Bidmon | 312/206 |
| 5,396,993 | 3/1995 | Spitler | 211/13 |
| 5,462,163 | 10/1995 | Berry | 206/370 |
| 5,615,782 | 4/1997 | Choe | 211/70.6 |

*Primary Examiner*—Derek J. Berger
*Assistant Examiner*—Kimberly Wood
*Attorney, Agent, or Firm*—Kolish, Hartwell, Dickinson, McCormack & Heuser

[57] ABSTRACT

A glue gun stand including a basin formed therein, a pedestal extending upwardly from the base adjacent the basin, and two narrow channels extending substantially downwardly into the pedestal. Each narrow channel provides bilateral restraint for legs of a glue gun, and the basin catches drips that may drop from a glue gun held in the stand. Two glue guns of different sizes may be held by the glue gun stand.

16 Claims, 1 Drawing Sheet

GLUE GUN STAND

CROSS-REFERENCE TO RELATED APPLICATIONS

This application is a continuing application of U.S. patent application Ser. No. 08/649,231 filed on May 17, 1996, now abandoned, the disclosures of which are incorporated herein by reference.

BACKGROUND OF THE INVENTION

The present invention relates to the field of tool stands and, in particular, to a stand that is designed to hold electric glue guns in an upright position and in close connection to a drip basin. Such guns typically will have a hot tip at the end which should be allowed to drip after use to clean off excess glue. It is believed that such a stand will have primary utility in catching glue that tends to drip off the tips of such guns and so create a clean working environment.

SUMMARY OF THE INVENTION

One embodiment of the glue gun stand of the present invention includes a basin formed therein, a pedestal extending upwardly from the base adjacent the basin, and two narrow channels extending substantially downwardly into the pedestal. Each narrow channel provides bilateral restraint for legs of a glue gun, and the basin catches drips that may drop from a glue gun held in the stand. Two glue guns of different sizes may be held by the glue gun stand.

It is an object of the present invention to hold safely and securely an electric glue gun and, preferably, two electric glue guns of different sizes.

Additional objects and advantages of the present invention will be understood more readily after a consideration of the drawings and the Detailed Description of the Preferred Embodiment.

DETAILED DESCRIPTION OF THE PREFERRED EMBODIMENT

Figure 1:
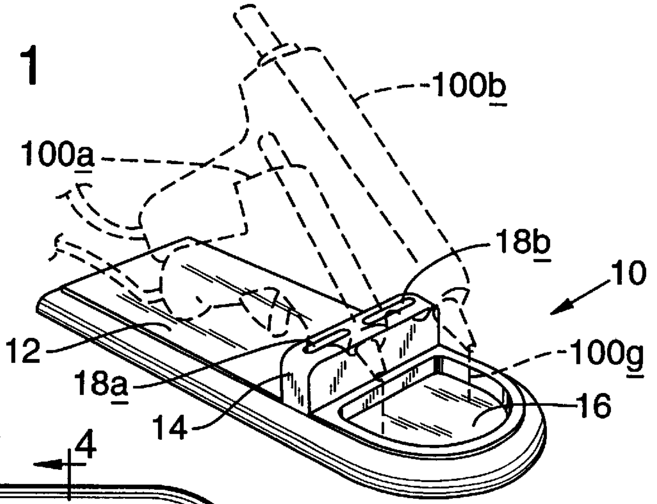
FIG. 1 is an isometric view of an embodiment of the glue gun stand of the present invention, take from the upper right front of the stand.

Referring to FIG. 1, a glue gun stand 10 is shown according to one embodiment of the present invention. Stand 10 includes a base 12 for supporting structure thereon, and a pedestal 14 extending upwardly from base 12, configured to hold glue guns 100*a* and 100*b*, as shown in dashed lines, in an approximately upright position. Preferably, base 12 defines a substantially planar surface divided by pedestal 14, with pedestal 14 extending substantially across base 12. A basin 16 is defined in base 12 to hold loose items, and is adjacent pedestal 14 so that any glue that drips from glue guns 100*a*, 100*b* may drip into basin 16, as indicated by dashed lines 100*g*. Basin 16 may be used as well for holding loose items often associated with crafts.

Figure 2:
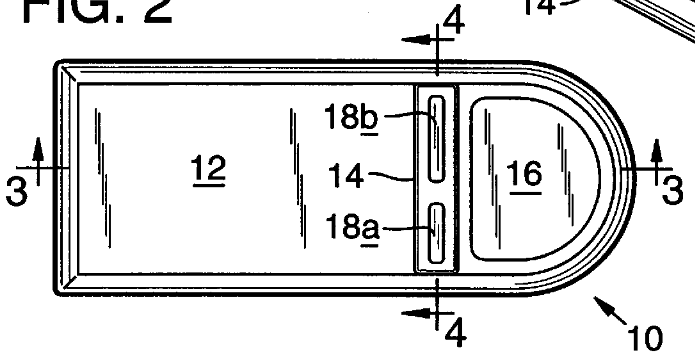
FIG. 2 is a top plan view of the stand shown in FIG. 1.
Figure 3:
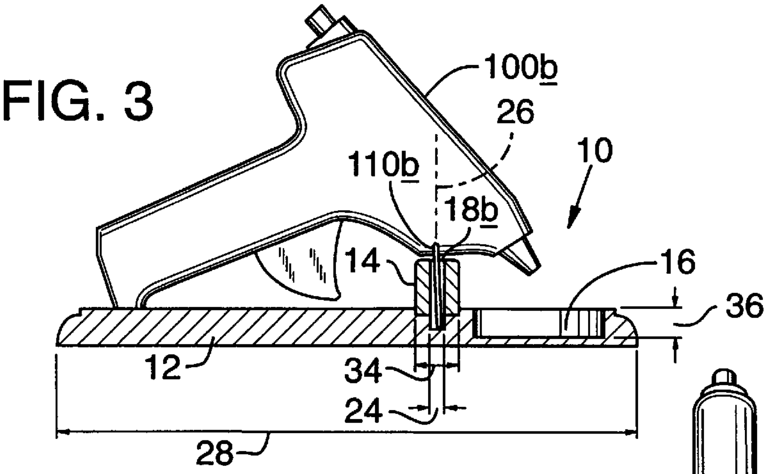
FIG. 3 is a cross-sectional side view of the stand shown in FIG. 2, taken generally along line 3—3 in FIG. 2, shown with the legs of a glue gun bilaterally restrained within a channel of the stand.
Figure 4:
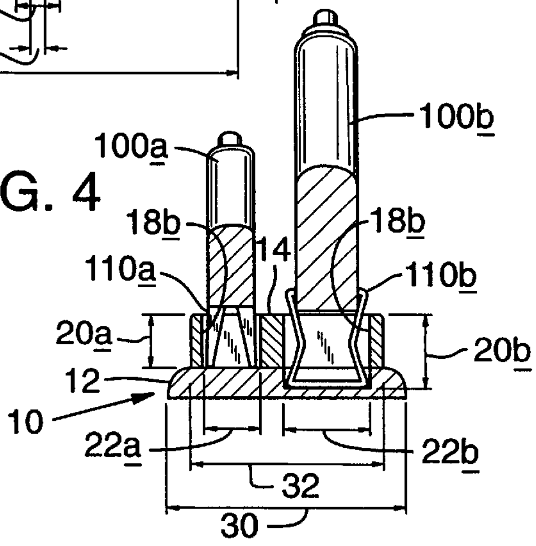
FIG. 4 is a cross-sectional front view of the stand shown in FIG. 2, taken generally along line 4—4 in FIG. 2, shown with the legs of two glue guns bilaterally restrained in channels formed in the stand.

Each glue gun 100*a*, 100*b* is restrained on stand 10 by a channel 18 extending substantially downwardly into pedestal 14, as understood best by reference to FIGS. 2 through 4. More specifically, two channels 18*a* and 18*b* preferably are formed in pedestal 14, as shown in FIG. 4. Each channel has a depth 20*a* and 20*b* and width 22*a* and 22*b*, into which legs 110*a* or 110*b* of glue guns 100*a* or 100*b* may be inserted, respectively. In FIG. 3, a length 24 of channel 18*b* is indicated and, as seen in FIG. 2, length 24 is approximately equal for both channels 18*a* and 18*b*.

In the embodiment shown, depth 20*a* is approximately one-inch, and depth 20*b* is greater than depth 20*a*, equal to approximately one-and-a-quarter-inch. Width 22*a* is approximately one-inch, and width 22*b* is approximately one-and-three-eighths-inch, each selected to conform relatively closely to the widths of legs 110 of conventional electric glue guns 100. Length 24 for both channels 18*a* and 18*b* is approximately one-quarter-inch, conforming relatively closely to the thickness of legs 110 of conventional electric glue guns 100.

In view of the differences between widths 22*a* or 22*b* and length 24, channels 18 are described herein as narrow channels. Referring to FIG. 3, leg 110*b* is shown laterally restrained within channel 18*b*, so that leg 110*b* can not pivot forward or backward relative to base 12. This provides a relatively secure support for glue gun 100*b*, even though leg 110*b* may be designed to pivot about gun 100*b*. A similar lateral restraint is provided in the side-to-side direction, as shown in FIG. 4.

Collectively, these aspects of channels 18 provide bilateral restraint for the legs of a glue gun. Specifically, channels 18 allow insertion and removal of the legs of a glue gun along an approximately vertical axis of movement, as indicated in FIG. 3 by axis 26. Glue guns 100*a* or 100*b* may be secured removably and reliably in an approximately upright position by sliding the legs of a glue gun into and out of channel 100*a* or 100*b*.

Referring again to FIG. 3, an overall length of base 12 is indicated, and in FIG. 4, a width 30 is indicated. Also indicated in FIG. 4 is a width 32 for pedestal 14, which will be seen to be approximately equal to width 30 of base 12. A length 34 for pedestal 14 is indicated in FIG. 3, which is substantially less than width 32. Preferably, length 28 is approximately 9- to 10-inches, width 30 is approximately 3- to 4-inches, width 32 is approximately one-half-inch less than width 30, and length 34 is less than one-inch. Finally, a depth 36 of basin 16, as indicated in FIG. 3, preferably is between one-half and one-inch.

The ratio of widths 22*a* and 22*b* of channels 18*a* and 18*b* to width 32 of pedestal preferably is approximately at least one to four. Channels 18*a* and 18*b* also preferably are co-linear along a central axis of pedestal 14, corresponding to line 4—4 in FIG. 2, extending along widths 22*a* and 22*b* of channels 18*a* and 18*b*. It has been found that these interrelationships of channels 18*a* and 18*b* to pedestal 14 result in a stand 10 that is of pleasing proportions, easy to use with two glue guns of different sizes, and very stable. Furthermore, it has been found that a stand 10 consisting essentially of planar base 12, basin 14, upwardly extending pedestal 16 and downwardly extending narrow channels 18 provides a stand that is simple, efficient, and effective.

While the present invention has been shown and described by reference to the preferred embodiment, it will be apparent to those skilled in the art that other changes in form and detail may be made therein without departing from the spirit and scope of the invention defined in the appended claims. For example, some of the claims are intended to encompass glue gun stands in which channels 18*a* and/or 18*b* may be formed directly in base 12, without the need for a pedestal. Some of the claims are also intended to encompass glue gun stands in which channels 18*a* and/or 18*b* may be formed with partially or completely open sides, while still providing bilateral restraint for the legs of a glue gun.

I claim:

1. A glue gun apparatus, comprising:

a first glue gun having one or more legs of a first dimension;

a second glue gun having one or more legs of a second dimension greater than the first dimension; and a glue gun stand, including a base having defined therein a basin; and a pedestal having two narrow channels extending substantially downwardly into the pedestal, a first of the channels sized to receive the legs of the first glue gun and conform relatively closely to the first dimension, and a second of the channels sized to receive the legs of the second glue gun and conform relatively closely to the second dimension , the narrow channels providing bilateral restraint for the legs of the first and second glue guns.

2. The glue gun apparatus according to claim 1, wherein the first of the channels has a first depth and the second of the channels has a second depth greater than the first.

3. The glue gun apparatus according to claim 2, wherein the first of the channels has a first width and the second of the channels has a second width, and wherein the first width and second width of the channels are at least one-quarter of the width of the base.

4. The glue gun apparatus according to claim 1, wherein the first of the channels has a first width and the second of the channels has a second width, and wherein the first width and second width of the channels are at least one-quarter of the width of the base.

5. The glue gun apparatus according to claim 1, wherein the pedestal extends upwardly from the base adjacent the basin, and wherein the narrow channels are defined at least partially by the pedestal.

6. The glue gun apparatus according to claim 5, wherein the base defines a substantially planar surface, and the planar surface is divided by the pedestal.

7. The glue gun apparatus according to claim 5, wherein the base has a width, and the pedestal extends substantially across the width of the base to have a width approximately equal to the width of the base.

8. The glue gun apparatus according to claim 7, wherein the first of the channels has a first width and the second of the channels has a second width, and wherein the first width and second width of the channels are at least one-quarter of the width of the base.

9. The glue gun apparatus according to claim 5, wherein the first of the channels has a first width and the second of the channels has a second width, and wherein the first width and second width of the channels are at least one-quarter of the width of the base.

10. A glue gun apparatus, comprising:

a first glue gun having one or more legs of a first dimension;

a second glue gun having one or more legs of a second dimension greater than the first dimension; and a glue gun stand, including an approximately planar base having defined therein a basin adjacent one end of the base, and having a length and a width; and a pedestal; wherein the pedestal:

extends upwardly from the base adjacent the basin;

extends across the width of the base;

has a width that is approximately equal to the width of the base;

has a length that is substantially less than the width of the pedestal; and includes two narrow channels extending substantially downwardly into the pedestal, a first of the channels being of a first width to receive and bilaterally restrain the legs of the first glue gun whereby the first glue gun may be secured removably and reliably in an approximately upright position by sliding the legs of the first glue gun into and out of the first channel, and a second of the channels being of a second width greater than the first width to receive the legs of the second glue gun.

11. The glue gun apparatus according to claim 10, wherein the first of the channels has a first depth and the second of the channels has a second depth greater than the first.

12. The glue gun apparatus according to claim 10, wherein the first width and second width of the channels are at least one-quarter of the width of the base.

13. A glue gun apparatus, comprising:

a glue gun having one or more legs;

a glue gun stand, including an approximately planar base having defined therein a basin adjacent one end of the base; and a pedestal that extends upwardly from the base adjacent the basin, and that includes a narrow channel extending substantially downwardly into the pedestal to define a bilateral restraint for the legs of the glue gun, the channel having a width, a length and a depth, the width extending approximately transversely to the basin, the length being substantially less than the width, and the depth being approximately equal to the width, whereby the legs of the glue gun may be bilaterally restrained in an approximately upright position, and may only be inserted into and removed from the channel along a substantially vertical axis of movement.

14. The glue gun apparatus according to claim 13, wherein the pedestal includes a second channel adjacent the channel.

15. The glue gun apparatus according to claim 14, wherein the channel and the second channel are approximately colinear along the widths of the channel and the second channel.

16. The glue gun apparatus according to claim 14, wherein the second channel has a width that is wider than the width of the channel, and a depth that is deeper than the depth of the channel.

* * * * *